(12) United States Patent
Kessler

(10) Patent No.: US 11,098,806 B2
(45) Date of Patent: Aug. 24, 2021

(54) PARTICULATE STREAM SPLITTING AND DIVERTING ASSEMBLY

(71) Applicant: Joshua Kessler, Flora, IL (US)

(72) Inventor: Joshua Kessler, Flora, IL (US)

( * ) Notice: Subject to any disclaimer, the term of this patent is extended or adjusted under 35 U.S.C. 154(b) by 35 days.

(21) Appl. No.: 16/710,823

(22) Filed: Dec. 11, 2019

(65) Prior Publication Data

US 2021/0180705 A1 Jun. 17, 2021

(51) Int. Cl.
*F16K 11/052* (2006.01)
*F16L 41/02* (2006.01)

(52) U.S. Cl.
CPC .......... *F16K 11/052* (2013.01); *F16L 41/023* (2013.01)

(58) Field of Classification Search
CPC ......... F16K 11/052; F16K 1/16; F16L 41/023
USPC ........................................ 137/875, 872, 861
See application file for complete search history.

(56) References Cited

U.S. PATENT DOCUMENTS

| | | |
|---|---|---|
| 2,605,076 A | 7/1952 | Tanke |
| 2,644,722 A | 7/1953 | Childress |
| 3,570,539 A | 3/1971 | Herring |
| D252,367 S | 7/1979 | Freedman et al. |
| 5,193,586 A | 3/1993 | Nolin, Jr. |
| 5,265,547 A * | 11/1993 | Daws ..................... A01C 7/087 111/175 |
| 6,182,699 B1 * | 2/2001 | Hawkes ................ F16K 11/052 137/861 |
| 6,991,415 B1 | 1/2006 | Anschultz |
| 7,182,101 B2 * | 2/2007 | Alacqua et al. ........ F03G 7/065 137/875 |
| 8,776,844 B1 | 7/2014 | Yaegel |
| 2001/0047834 A1 * | 12/2001 | Menin et al. ....... F16K 11/0525 137/875 |
| 2005/0120356 A1 | 6/2005 | Mecheneau |

* cited by examiner

*Primary Examiner* — Kevin L Lee

(57) ABSTRACT

A particulate stream splitting and diverting assembly for splitting a stream of grain includes a pipe, which comprises a first section and a pair of second sections. Each second section extends transversely from a bottom of the first section so that the pipe is Y-shaped. A diverter is positioned in the pipe proximate to a junction of the first section and the pair of second sections. The diverter is configured to selectively split a stream of particulates into a pair of substreams of particulates as the stream passes from the first section to the pair of second sections.

9 Claims, 4 Drawing Sheets

PARTICULATE STREAM SPLITTING AND DIVERTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to diverting assembly and more particularly pertains to a new diverting assembly for splitting a stream of grain.

(2) Description of Related Art Including Information Disclosed Under 37 CFR 1.97 and 1.98

The prior art relates to diverting assembly.

BRIEF SUMMARY OF THE INVENTION

An embodiment of the disclosure meets the needs presented above by generally comprising a pipe, which in turn comprises a first section and a pair of second sections. Each second section extends transversely from a bottom of the first section so that the pipe is Y-shaped. A diverter is positioned in the pipe proximate to a junction of the first section and the pair of second sections. The diverter is configured to selectively split a stream of particulates into a pair of substreams of particulates as the stream passes from the first section to the pair of second sections.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
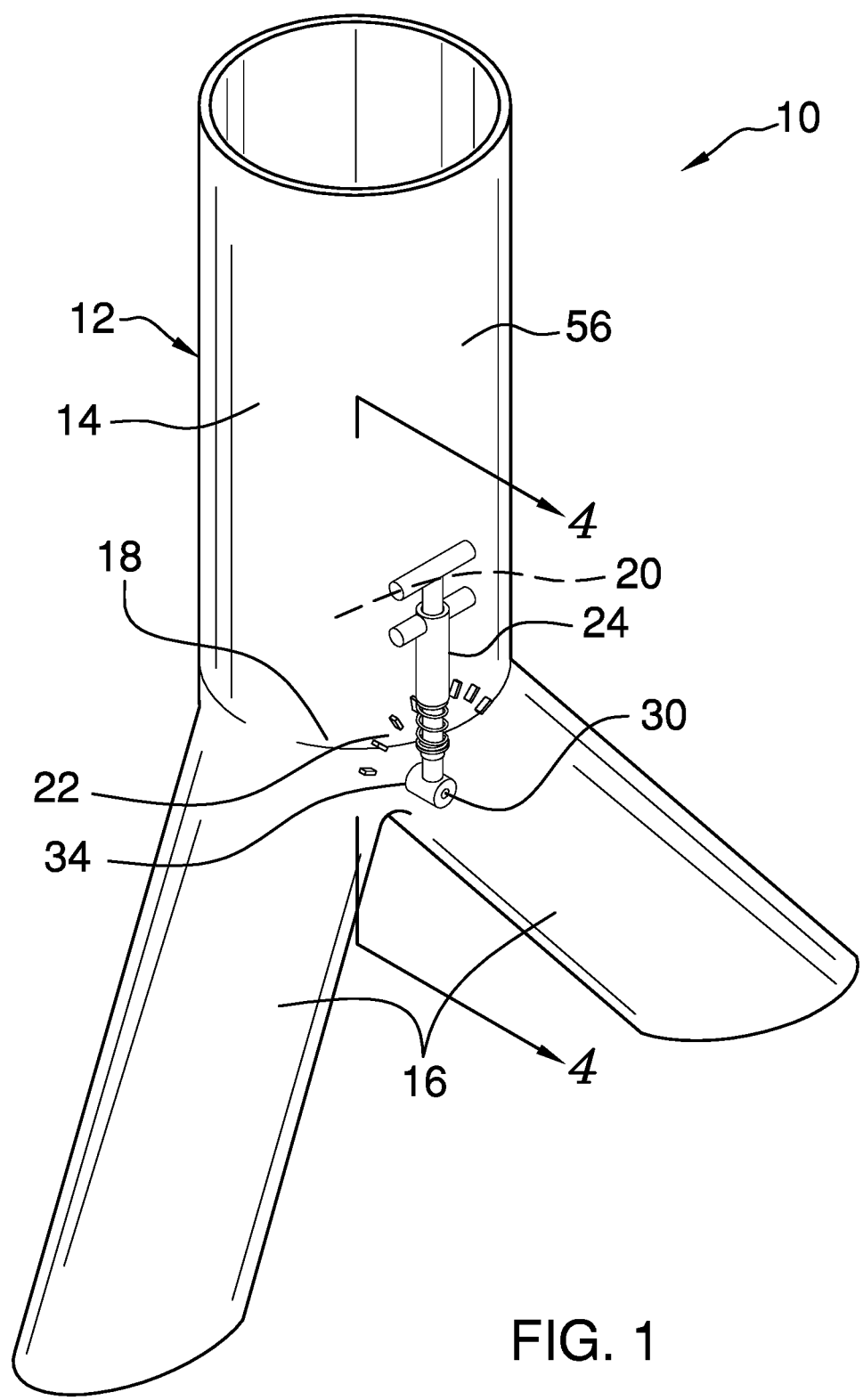
FIG. 1 is an isometric perspective view of a particulate stream splitting and diverting assembly according to an embodiment of the disclosure.
Figure 2:
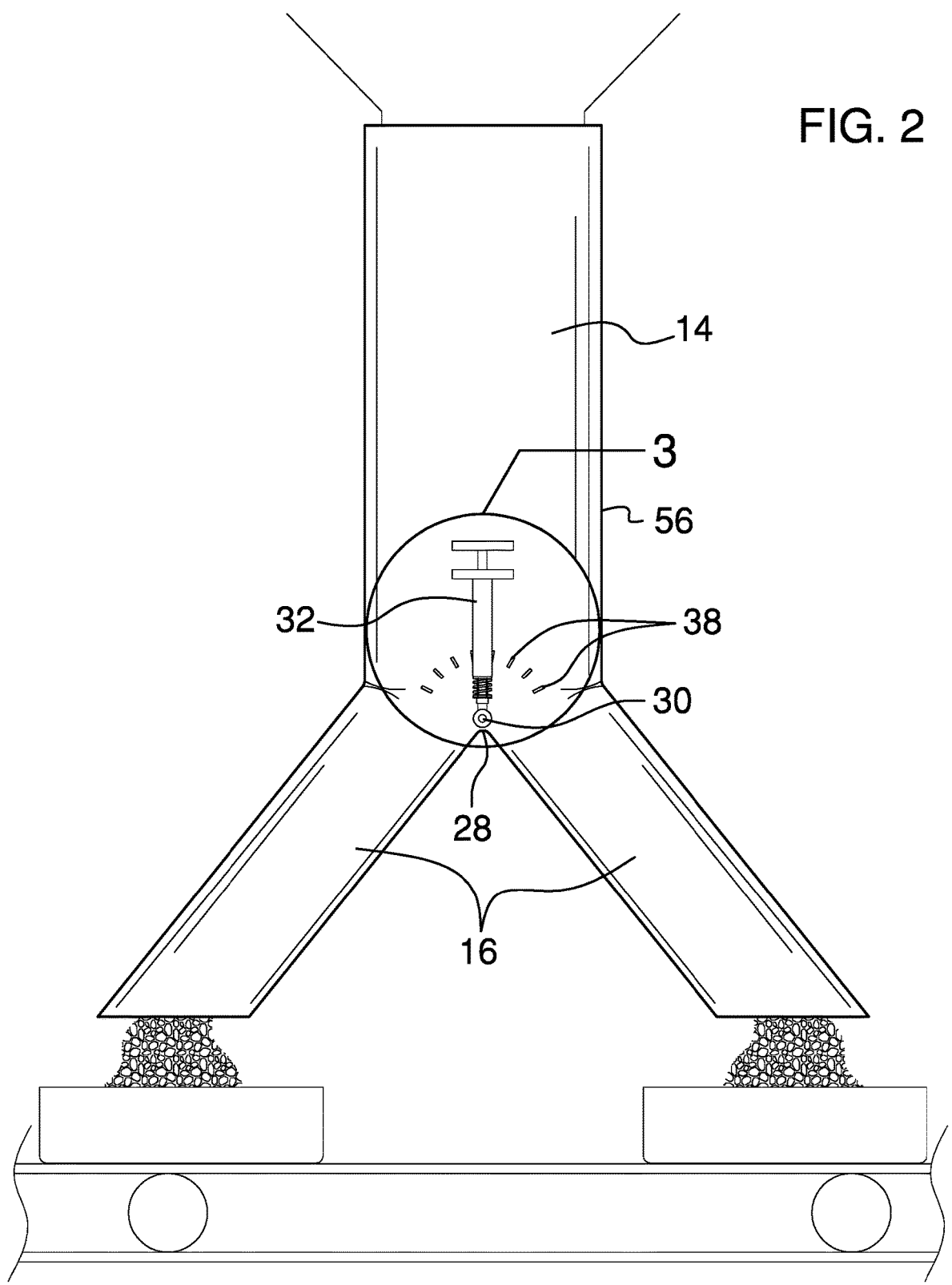
FIG. 2 is an in-use view of an embodiment of the disclosure.

With reference now to the drawings, and in particular to FIGS. 1 through 4 thereof, a new diverting assembly embodying the principles and concepts of an embodiment of the disclosure and generally designated by the reference numeral 10 will be described.

As best illustrated in FIGS. 1 through 4, the particulate stream splitting and diverting assembly 10 generally comprises a pipe 12, which in turn comprises a first section 14 and a pair of second sections 16. Each second section 16 extends transversely from a bottom 18 of the first section 14 so that the pipe 12 is Y-shaped. A diverter 20 is positioned in the pipe 12 proximate to a junction 22 of the first section 14 and the pair of second sections 16. The diverter 20 is configured to selectively split a stream of particulates into a pair of substreams of particulates as the stream passes from the first section 14 to the pair of second sections 16.

The assembly 10, when positioned receive the output of an auger or conveyer, enables a user to direct the pair of substreams of particulates, such as grain, to a pair of receiving vessels. In another use, the assembly 10 in an inverted configuration can be used to combine a pair of substreams of particulates into a stream of particulates as the pair of substreams passes from the pair of second sections 16 to the first section 14 of the pipe 12.

The first section 14 of the pipe 12 is circumferentially larger than each of the second sections 16 of the pipe 12 so as to accommodate a stream of particulates equivalent to the pair of substreams of particulates. The second sections 16 are substantially circumferentially equivalent. The first section 14 and each of the second sections 16 are circularly shaped when viewed longitudinally.

An actuator 24, which is coupled to the pipe 12 proximate to the junction 22, is operationally coupled to the diverter 20 so that the actuator 24 is positioned to selectively actuate the diverter 20 to split the stream of particulates into the pair of substreams of particulates as the stream passes from the first section 14 to the pair of second sections 16. The actuator 24 allows the user to vary flow of the substreams so that different quantities of particulates are delivered to each of the receiving vessels.

The present invention anticipates any variation of actuator that can be used to actuate the diverter 20, to include both manually and mechanically motivated actuators, such as a motor. Mechanically motivated actuators offer the potential for remote operation and would allow the user to adjust the diverter 20 from a distal location.

Figure 3:
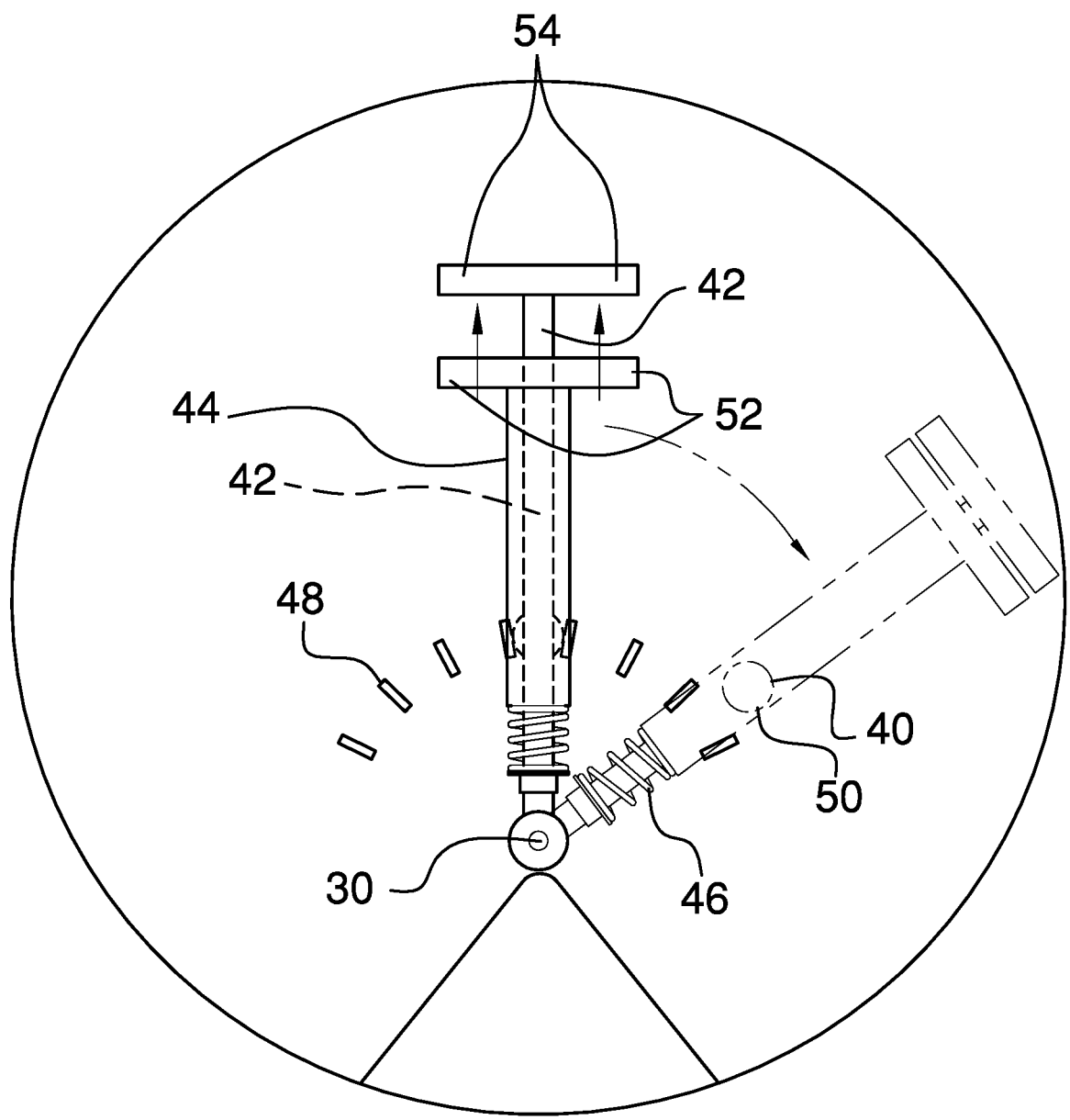
FIG. 3 is a detail view of an embodiment of the disclosure.
Figure 4:
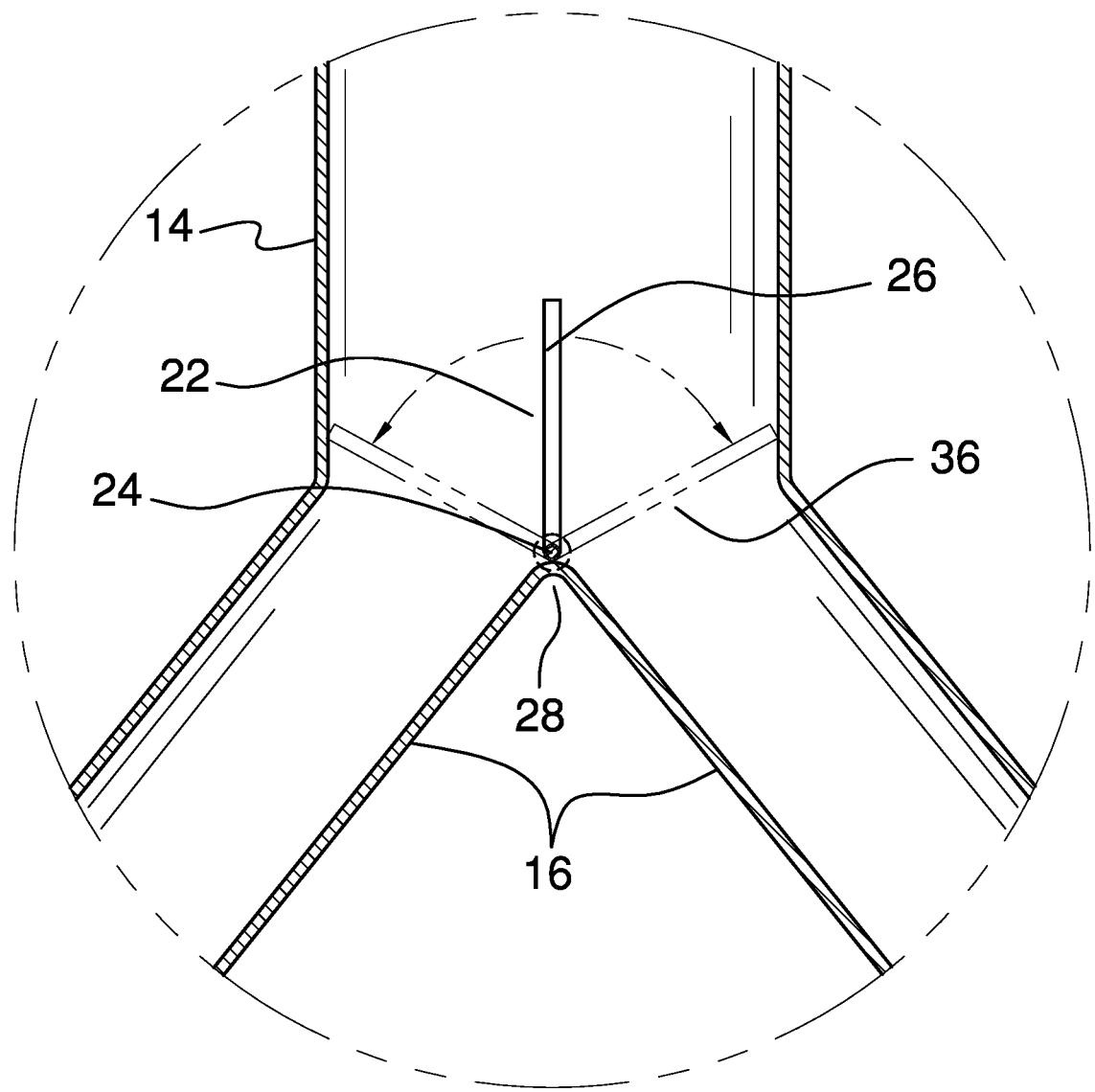
FIG. 4 is a cross-sectional view of an embodiment of the disclosure.

The diverter 20 comprises a plate 26 that is pivotally coupled to an intersection 28 of the second sections 16, as shown in FIG. 4, so that the plate 26 is selectively pivotable to split the stream of particulates. The actuator 24 comprises a first rod 30 and a handle 32, as shown in FIG. 3. The first rod 30 is coupled to the plate 26 and extends through an aperture 34 that is positioned in a wall 56 of the pipe 12 proximate to the intersection 28. The handle 32 is coupled to and extends from the first rod 30. The handle 32 is configured to be grasped in a hand of the user, positioning the user to rotate the first rod 30 to selectively position the plate 26 to split the stream of particulates into the pair of substreams of particulates as the stream passes from the first section 14 to the pair of second sections 16.

The plate 26 is sized and shaped substantially complementarity to an inner perimeter 36 of a respective second section 16 of the pipe 12 so that the plate 26 is positioned to selectively and substantially close the respective second section 16. With the plate positioned such, the stream of particulates is directed only to the other second section 16 of the pipe 12.

A plurality of first couplers 38 is coupled to the pipe 12. A second coupler 40 is coupled to the handle 32. The second coupler 40 is complementary to each of the first couplers 38 so that the second coupler 40 is positioned to selectively couple to a respective first coupler 38 to fixedly position the plate 26.

The handle 32 comprises a second rod 42, a tube 44, and a spring 46, as shown in FIG. 3. The second rod 42 is coupled to and extends from the first rod 30. The spring 46 is coupled to the second rod 42 proximate to the first rod 30. The tube 44 is coupled to the spring 46 and is positioned around the second rod 42.

Each first coupler 38 comprises a recess 48 that is positioned in the pipe 12, as shown in FIG. 43. The recess 48 extends arcuately into the wall 56 of the pipe 12. The plurality of recesses 48 extends arcuately so that each recess 48 is equally distant from the first rod 30. The second coupler 40 comprises a pin 50 that is coupled to and extensible from the tube 44. The pin 50 is spring loaded so that the pin 50 is biased to an extended position. The pin 50 is arcuate distal from the tube 44 so that the pin 50 is complementary to the recesses 48. The pin 50 is positioned to selectively insert into a respective recess 48 to fixedly position the plate 26.

A pair of first tabs 52 is coupled to and extends substantially perpendicularly from the tube 44 distal from the first rod 30. A pair of second tabs 54 is coupled to and extends substantially perpendicularly from the second rod 42 distal from the first rod 30. The pair of second tabs 54 is configured to position a palm of the hand of the user, positioning digits of the hand to pull the first tabs 52 toward the second tabs 54 so that the tube 44 is extended along the first rod 30 concurrently with extraction of the pin 50 from the respective recess 48 and tensioning of the spring 46.

The tensioning of the spring 46 positions the spring 46 to rebound upon release of the first tabs 52 so that the pin 50 is positioned to selectively insert into a respective recess 48 to fixedly position the plate 26. The configuration of the spring 46, tube 44, pin 50, and recesses 48 assures that the plate 26 will remain is fixed position until the user pulls the tube 44 up with the first tabs 52.

In use, the first section 14 of the pipe 12 is positioned to receive the output of the auger or the conveyer to direct the pair of substreams of particulates to the pair of receiving vessels. The actuator 24 is used to vary the flow of the substreams, as required, so that selected quantities of particulates are delivered to each of the receiving vessels.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A particulate stream splitting and diverting assembly comprising:
    a pipe, the pipe comprising a first section and a pair of second sections, each second section being extending transversely from a bottom of the first section such that the pipe is Y-shaped;
    a diverter positioned in the pipe proximate to a junction of the first section and the pair of second sections wherein the diverter is configured for selectively splitting a stream of particulates into a pair of substreams of particulates as the stream passes from the first section to the pair of second sections;
    an actuator coupled to the pipe proximate to the junction, the actuator being operationally coupled to the diverter such that the actuator is positioned for selectively actuating the diverter for splitting the stream of particulates into the pair of substreams of particulates as the stream passes from the first section to the pair of second sections;
    the diverter comprising a plate pivotally coupled to an intersection of the second sections such that the plate is selectively pivotable for splitting the stream of particulates;
    the actuator comprising a first rod and a handle, the first rod being coupled to the plate and extending through an aperture positioned in a wall of the pipe proximate to the intersection, the handle being coupled to and extending from the first rod wherein the handle is configured for grasping in a hand of a user positioning the user for rotating the first rod for selectively positioning the plate for splitting the stream of particulates into the pair of substreams of particulates as the stream passes from the first section to the pair of second sections;
    a plurality of first couplers coupled to the pipe; and
    a second coupler coupled to the handle, the second coupler being complementary to each of the first couplers such that the second coupler is positioned for selectively coupling to a respective first coupler for fixedly positioning the plate.

2. The assembly of claim 1, further including the first section being circumferentially larger than each of the second sections.

3. The assembly of claim 2, further including the second sections being substantially circumferentially equivalent.

4. The assembly of claim 1, further including the first section being circularly shaped when viewed longitudinally.

5. The assembly of claim 1, further including each of the second sections being circularly shaped when viewed longitudinally.

6. The assembly of claim 1, further including the plate being sized and shaped substantially complementarity to an inner perimeter of a respective second section of the pipe such that the plate is positioned for selectively substantially closing the respective second section.

7. The assembly of claim 1, further comprising:
the handle comprising a second rod, a tube, and a spring, the second rod being coupled to and extending from the first rod, the spring being coupled to the second rod proximate to the first rod, the tube being coupled to the spring and positioned around the second rod;
each first coupler comprising a recess positioned in the wall of the pipe, the recess extending arcuately into a wall of the pipe, the plurality of recesses extending arcuately such that each recess is equally distant from the first rod; and
the second coupler comprising a pin coupled to and extensible from the tube, the pin being spring loaded such that the pin is biased to an extended position, the pin being arcuate distal from the tube such that the pin is complementary to the recesses wherein the pin is positioned for selectively inserting into a respective recess for fixedly positioning the plate.

8. The assembly of claim 7, further comprising:
a pair of first tabs coupled to and extending substantially perpendicularly from the tube distal from the first rod; and
a pair of second tabs coupled to and extending substantially perpendicularly from the second rod distal from the first rod wherein the pair of second tabs is configured for positioning a palm of the hand of the user positioning digits of the hand for pulling the first tabs toward the second tabs such that the tube is extended along the first rod concurrent with extraction of the pin from the respective recess and tensioning of the spring positioning the spring for rebounding upon release of the first tabs such that the pin is positioned for selectively inserting into a respective recess for fixedly positioning the plate.

9. A particulate stream splitting and diverting assembly comprising:
a pipe, the pipe comprising a first section and a pair of second sections, each second section being extending transversely from a bottom of the first section such that the pipe is Y-shaped, the first section being circumferentially larger than each of the second sections, the second sections being substantially circumferentially equivalent, the first section being circularly shaped when viewed longitudinally, each of the second sections being circularly shaped when viewed longitudinally;
a diverter positioned in the pipe proximate to a junction of the first section and the pair of second sections wherein the diverter is configured for selectively splitting a stream of particulates into a pair of substreams of particulates as the stream passes from the first section to the pair of second sections, the diverter comprising a plate pivotally coupled to an intersection of the second sections such that the plate is selectively pivotable for splitting the stream of particulates, the plate being sized and shaped substantially complementarity to an inner perimeter of a respective second section of the pipe such that the plate is positioned for selectively substantially closing the respective second section;
an actuator coupled to the pipe proximate to the junction, the actuator being operationally coupled to the diverter such that the actuator is positioned for selectively actuating the diverter for splitting the stream of particulates into the pair of substreams of particulates as the stream passes from the first section to the pair of second sections, the actuator comprising a first rod and a handle, the first rod being coupled to the plate and extending through an aperture positioned a wall in the pipe proximate to the intersection, the handle being coupled to and extending from the first rod wherein the handle is configured for grasping in a hand of a user positioning the user for rotating the first rod for selectively positioning the plate for splitting the stream of particulates into the pair of substreams of particulates as the stream passes from the first section to the pair of second sections, the handle comprising a second rod, a tube, and a spring, the second rod being coupled to and extending from the first rod, the spring being coupled to the second rod proximate to the first rod, the tube being coupled to the spring and positioned around the second rod;
a plurality of first couplers coupled to the pipe, each first coupler comprising a recess positioned in the pipe, the recess extending arcuately into the wall of the pipe, the plurality of recesses extending arcuately such that each recess is equally distant from the first rod;
a second coupler coupled to the handle, the second coupler being complementary to each of the first couplers such that the second coupler is positioned for selectively coupling to a respective first coupler for fixedly positioning the plate, the second coupler comprising a pin coupled to and extensible from the tube, the pin being spring loaded such that the pin is biased to an extended position, the pin being arcuate distal from the tube such that the pin is complementary to the recesses wherein the pin is positioned for selectively inserting into a respective recess for fixedly positioning the plate;
a pair of first tabs coupled to and extending substantially perpendicularly from the tube distal from the first rod; and
a pair of second tabs coupled to and extending substantially perpendicularly from the second rod distal from the first rod wherein the pair of second tabs is configured for positioning a palm of the hand of the user positioning digits of the hand for pulling the first tabs toward the second tabs such that the tube is extended along the first rod concurrent with extraction of the pin from the respective recess and tensioning of the spring positioning the spring for rebounding upon release of the first tabs such that the pin is positioned for selectively inserting into a respective recess for fixedly positioning the plate.

* * * * *